United States Patent
Lau et al.

(10) Patent No.: US 11,999,528 B2
(45) Date of Patent: Jun. 4, 2024

(54) PACKAGING STORAGE CONTAINER

(71) Applicant: FINEST PRODUCTS LIMITED., Hong Kong (CN)

(72) Inventors: Kwok Din Lau, Hong Kong (CN); Kwan Ming Jimmy Lau, Hong Kong (CN)

(73) Assignee: FINEST PRODUCTS LIMITED., Hong Kong (CN)

( * ) Notice: Subject to any disclaimer, the term of this patent is extended or adjusted under 35 U.S.C. 154(b) by 244 days.

(21) Appl. No.: 17/552,363

(22) Filed: Dec. 16, 2021

(65) Prior Publication Data
US 2023/0192360 A1 Jun. 22, 2023

(51) Int. Cl.
*B65D 81/05* (2006.01)
*B65D 25/10* (2006.01)
(Continued)

(52) U.S. Cl.
CPC ......... *B65D 25/108* (2013.01); *B65D 43/162* (2013.01); *B65D 81/05* (2013.01); *G11B 33/025* (2013.01); *G11B 33/045* (2013.01)

(58) Field of Classification Search
CPC . G11B 33/025; G11B 33/0427; G11B 33/045; G11B 33/0411; G11B 33/0433; G11B 33/0494; G11B 33/0461; G11B 33/016; B65D 25/108; B65D 43/162; B65D 81/05
(Continued)

(56) References Cited

U.S. PATENT DOCUMENTS 5,845,771 A * 12/1998 Fu .................. G11B 33/045
7,353,941 B2 * 4/2008 Boland ............ G11B 33/0427
(Continued)

FOREIGN PATENT DOCUMENTS

CN 1067762 A 1/1993
CN 2538054 Y 2/2003
(Continued)

OTHER PUBLICATIONS

First Office Action dated Oct. 24, 2024 for Japanese patent application No. 2022-197916, English translation provided by Global Dossier.

*Primary Examiner* — Steven A. Reynolds
(74) *Attorney, Agent, or Firm* — Yue (Robert) Xu; Apex Attorneys at Law, LLP

(57) ABSTRACT

A packaging storage container used for accommodating a sheet-like object includes a container bottom portion, a container cover portion, a ridge member and a tray. The container bottom portion and the container cover portion are hinged to the ridge member, and form a sealed container body with the ridge member. The tray is configured to hold the sheet-like object; the ridge member is provided with a pair of articulated shaft-receiving bases, the tray is connected to a pair of articulated shaft-receiving bases through an articulated shaft provided on the tray, an inner space for self-adaptive rotation and shock absorption of the articulated shaft is formed in the articulated shaft-receiving base, the articulated shaft is provided with a pair of flange portions, the longitudinal length of the articulated shaft between the pair of flange portions is configured to be accommodated in the inner space.

8 Claims, 9 Drawing Sheets

(51) Int. Cl.
  *B65D 43/16* (2006.01)
  *G11B 33/02* (2006.01)
  *G11B 33/04* (2006.01)

(58) Field of Classification Search
  USPC .................................................. 206/308.1
  See application file for complete search history.

(56) References Cited

U.S. PATENT DOCUMENTS

| | | | |
|---|---|---|---|
| 2002/0112974 A1* | 8/2002 | Lau | G11B 33/045 |
| 2003/0196918 A1 | 10/2003 | Lau | |
| 2005/0269222 A1 | 12/2005 | Cheung | |
| 2007/0114147 A1 | 5/2007 | Libohova | |
| 2007/0170078 A1* | 7/2007 | Choi | G11B 33/045 |
| 2008/0041742 A1* | 2/2008 | Lau | G11B 33/0427 |
| 2010/0155275 A1* | 6/2010 | Freitag | G11B 33/045 |
| | | | 206/308.1 |
| 2010/0200441 A1 | 8/2010 | Choi et al. | |
| 2011/0031141 A1* | 2/2011 | Lau | G11B 33/045 |
| | | | 206/308.1 |
| 2023/0182960 A1* | 6/2023 | Lau | B65D 43/162 |
| | | | 206/408 |

FOREIGN PATENT DOCUMENTS

| | | |
|---|---|---|
| CN | 101506889 A | 8/2009 |
| CN | 110562612 A | 12/2019 |
| EP | 1260455 A1 | 11/2002 |
| GB | 2256424 | 12/1992 |
| JP | 2001-278373 A | 10/2001 |
| JP | 2002-308367 A | 10/2002 |
| JP | 2013-500910 A | 1/2013 |
| KR | 20030006457 A | 1/2003 |

\* cited by examiner

PACKAGING STORAGE CONTAINER

FIELD

The present application relates to the technical field of object storage, and in particular to a packaging storage container for storing sheet-like objects.

BACKGROUND

Generally, a packaging storage container is used by users to store sheet-like objects, such as a star card, a stamp, a multimedia storage disk, or a data storage card. Since the above objects are thin and easily damaged, the user has a higher requirement to the anti-fall performance of the packaging storage container and the protection performance of the contained objects.

In the conventional technology, one type of the packaging containers for accommodating the sheet-like object is provided with a tray hinged to a packaging container body. The tray may also be used to hold the sheet-like object. However, such type of container has the following problems in use: firstly, the tray is easily stuck when being turned over, which causes an articulated shaft of the tray hinged to the packaging container body to be broken; secondly, the tray may be moved back and forth with the overturning of a cover of the packaging container, and a moving trajectory is irregular, and thus the overturning of the cover is blocked when the tray is in an abnormal position, and the articulated shaft of the tray hinged to the packaging container may be broken if the cover continues to be turned over, and after the container is closed, the tray is unstable and may shake inside the packaging container, and when the container falls, the tray may fly out of the container.

SUMMARY

In order to solve the problem in the conventional technology that an articulated shaft of a tray hinged to a packaging container body is easy to be broken, and the tray is unstable, the present application is direct to a packaging container.

In view of this, a packaging storage container used for accommodating a sheet-like object, is provided according to the present application, said packaging storage container comprises a container bottom portion, a container cover portion, a ridge member and a tray;
the container bottom portion and the container cover portion are hinged to the ridge member, the container bottom portion and the container cover portion form a sealed container body with the ridge member, and the tray is configured to hold the sheet-like object;
the ridge member is provided with a pair of articulated shaft-receiving bases, the tray is connected to a pair of articulated shaft-receiving bases through an articulated shaft provided on the tray, an inner space for self-adaptive rotation and shock absorption of the articulated shaft is formed in the articulated shaft-receiving base, the articulated shaft is provided with a pair of flange portions with column shape in axial direction thereof, the longitudinal length of the articulated shaft between the pair of flange portions is configured to correspond to the articulated shaft-receiving base and be accommodated in the inner space so that the tray is turned over around the articulated shaft-receiving base; and
both the container bottom portion and the container cover portion are provided with a guiding member, and the tray is provided with a protruding portion cooperating with the guiding member,
the diameter of the pair of flange portions is greater than the largest lateral width of the limiting walls.

Preferably, the guiding member is provided with a guiding groove, which cooperates with the protruding portion of the tray.

Preferably, the ridge member is provided with a pair of articulated shaft-protection members at both longitudinal ends thereof, which are located longitudinal outside the articulated shaft-receiving base,
the articulated shaft-protection members have a shape of box and are open to the axial ends of the articulated shaft,
the articulated shaft-protection members are provided with an elastic sheet and a stopper, the elastic sheet faces the axial end of the articulated shaft and is elastic and the stopper is arranged opposite to the axial end of the articulated shaft and configured to support the elastic sheet from backside,
when the axial end of the articulated shaft is moved toward and thus abutted against the elastic sheet, the elastic sheet moves together with the articulated shaft, which is stopped by the stopper from back support.

Preferably, the guiding member further comprises a pair of guiding blocks, the guiding blocks are provided with an arc-shaped chamfer, and the guiding groove is formed by a space between the pair of guiding blocks in a longitudinal direction of the packaging storage container.

Preferably, an inclined surface is provided on a side of the guiding blocks facing the guiding groove.

Preferably, the guiding member comprises an upper guiding member and a lower guiding member with the same structure, both the container bottom portion and the container cover portion have a container edge member, the upper guiding member is provided on the container edge member of the container cover portion, the lower guiding member is provided on the container edge member of the container bottom portion, a position of the upper guiding member corresponds to a position of the lower guiding member, and the guiding blocks of the upper guiding member match and abut against the guiding block of the lower guiding member when the packaging container is closed.

Preferably, each of the articulated shaft-receiving bases comprises a connecting piece and a pair of limiting walls, a lower end of the limiting walls is connected to the ridge member, and an upper end of the limiting walls is provided with hook-shaped members, and the hook-shaped members are provided opposite to each other, the connecting piece is provided between the pair of the limiting walls and is respectively connected with the pair of the limiting walls to form the inner space for accommodating the articulated shaft, and the connecting piece is an arc-shaped piece curved upwards.

Preferably, the pair of limiting walls is configured to be spaced apart from each other, so that the articulated shaft at one lateral end of the tray does not contact with the limiting walls when the other lateral end of the tray abuts against the container edge member.

Preferably, a first protuberance member and a second protuberance member for holding the sheet-like object are provided on the tray, and the first protuberance member and the second protuberance member are respectively located on opposite surfaces of each tray with being offset with each other.

Compared with the conventional technology, the advantages according to the embodiments of the present application are as follows.

According to the present application, an inner space for self-adaptive rotation and shock absorption of the articulated shaft is provided in articulated shaft-receiving base, and when the tray is turned over, the tray can be adaptively moved along inner walls of the limiting walls and the connecting piece, which can prevent the articulated shaft from being broken when being stuck in the articulated shaft-receiving base. The pair of the limiting walls are provided separately with being spaced a distance, so that in case that one end of the tray abuts against the container edge member, the articulated shaft at the other end of the tray does not contact with the limiting walls, which can prevent the articulated shaft from striking the articulated shaft-receiving base and being broken when the packaging storage container falls. The container edge member is provided with the guiding member, when the container cover portion is turned over into the close state, the protruding portion of the tray can just enter into the guiding groove of the guiding member, so that the tray is moved along the predetermined trajectory, which prevents the articulated shaft from being broken when the tray is in an abnormal position, and after the packaging container is closed, the guiding member can hold the tray and continue to limit the movement of the tray, which ensures the tray not to shake. The front and back surfaces of the tray are provided with the protuberance member, which can hold the sheet-like objects on both surfaces, and the container bottom portion is further provided with the protuberance member, which can hold another sheet-like object.

BRIEF DESCRIPTION OF THE DRAWINGS

For more clearly illustrating embodiments of the present disclosure or the technical solutions in the conventional technology, drawings to be used in the description of the embodiments or the conventional technology will be briefly described hereinafter. Apparently, the drawings in the following description are only some embodiments of the present disclosure. For those skilled in the art, other drawings may be obtained based on the provided drawings without any creative work.

Figure 1:
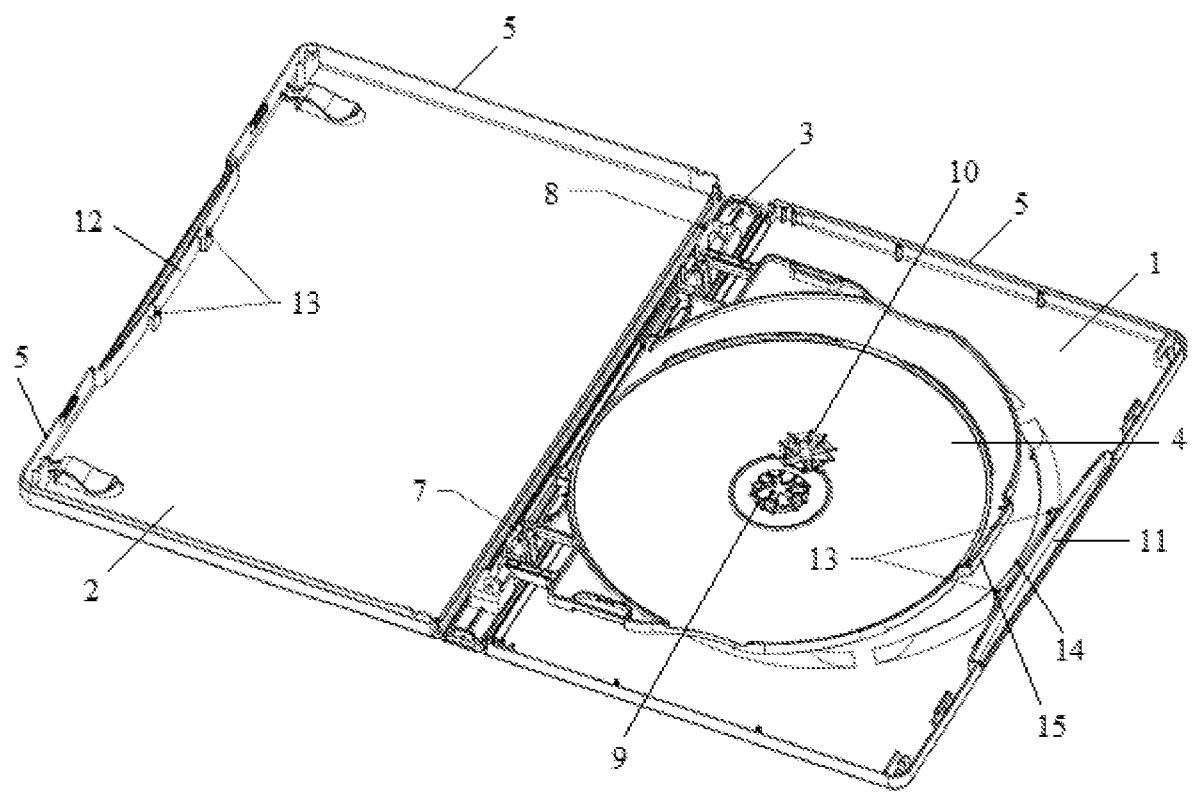
FIG. 1 is a schematic view of a packaging storage container in an open state according to embodiments of the present application.

REFERENCE NUMERALS IN THE DRAWINGS ARE AS FOLLOWS 1 container bottom portion; 2 container cover portion;
3 ridge member; 4 tray;
5 container edge member; 6 articulated shaft;
7 articulated shaft-receiving base; 8 articulated shaft-protection member
9 first protuberance member; 10 second protuberance member;
11 lower guiding member; 12 upper guiding member;
13 guiding block; 14 guiding groove;
15 protruding portion; 16 limiting wall;
17 connecting piece; 18 hook-shaped member;
61 protruding portion; 81 elastic sheet;
82 stopper.

DETAILED DESCRIPTION OF THE EMBODIMENTS

The technical solutions according to the present disclosure will be described clearly and completely as follows in conjunction with the drawings. It is apparent that the described embodiments are only a part of the embodiments according to the present disclosure, rather than all of the embodiments. Based on the embodiments of the present application, all other obtained without creative efforts by those of the ordinary skill in the art shall fall within the protection scope of the present application.

In the description of the present application, it should be noted that, the orientation or position relationship indicated by the terms "center", "upper", "lower", "left", "right", "vertical", "horizontal", "inner" and "outer" is based on the orientation or position relationship shown in the drawing, which is merely for the convenience of describing the present application and simplifying the description, rather than indicating or implying that the device or member must have a specific orientation, be constructed and operated in a specific orientation, and therefore cannot be understood as limiting the present application. In addition, the terms "first", "second" and "third" are merely used for descriptive objects, and cannot be understood as indicating or implying relative importance.

In the description of the present application, it should be noted that, unless otherwise clearly specified and limited, the terms "mounting", "connection" or "communication" should be understood in a broad sense. For example, it may be a fixed connection or a detachable connection; it may be a mechanical connection or an electrical connection; it may be a direct connection, or an indirect connection through an intermediate medium, or an internal communication between two components. For those skilled in the art, the specific meaning of the above terms in the present application can be understood under specific circumstances.

Herein, the term "longitudinal" or "longitudinal direction" refers to the direction of the largest length of the packaging storage container, which is in the same direction with the axial length of the articulated shaft, and the term "lateral" or "lateral direction" refers to the direction of the width of the packaging storage container, which is perpendicular to the "longitudinal direction".

Embodiment 1

Referring to FIG. 1, a packaging storage container is provided according to the present application, which is configured to accommodate a sheet-like object, and includes a container bottom portion 1, a container cover portion 2, a ridge member 3 and a tray 4. The container bottom portion 1 and the container cover portion 2 are hinged to two opposite lateral edges of the ridge member 3, the container bottom portion 1 and the container cover portion 2 are both provided with container edge members 5, the container bottom portion 1 and the container cover portion 2 form a sealed container body with the ridge member 3, and the sheet-like objects are stored in the sealed container body. The container bottom portion 1 and the container cover portion 2 can turn over around the ridge member 3, so that the packaging storage container can be operated between an open state and a close state. The tray 4 is configured to hold and accommodate the sheet-like objects.

Referring to FIG. 1 and FIGS. 2A-2C, the ridge member 3 is provided with a pair of separate articulated shaft-receiving bases 7, the tray 4 is connected to the articulated shaft-receiving base 7 through an articulated shaft 6 provided thereon, an inner space for self-adaptive rotation and shock absorption of the articulated shaft 6 is defined in the articulated shaft-receiving base 7, and the articulated shaft 6 is received in the inner space of the articulated shaft-receiving base 7, so that the tray 4 can turn over around the articulated shaft-receiving base 7.

Figure 2A:
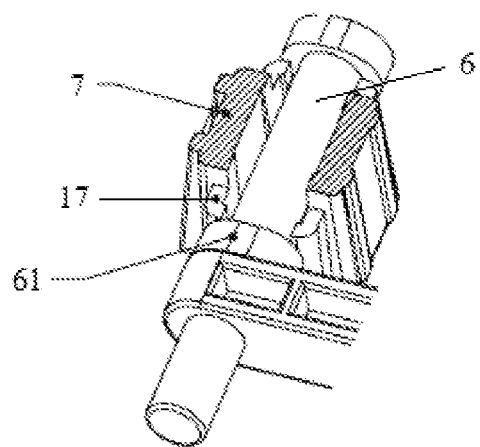
FIG. 2A is a schematic view of the fitting of an articulated shaft-receiving base with an articulated shaft of the packaging storage container according to embodiments of the present application.
Figure 2B:
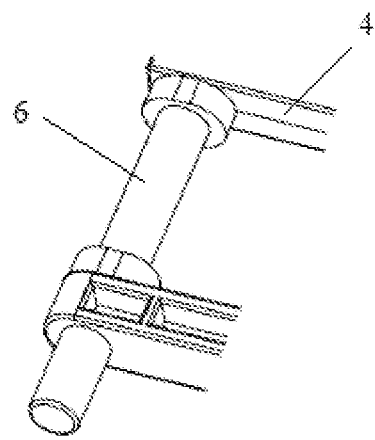
FIG. 2B is a schematic structural view of the articulated shaft of the packaging storage container according to embodiments of the present application.
Figure 2C:
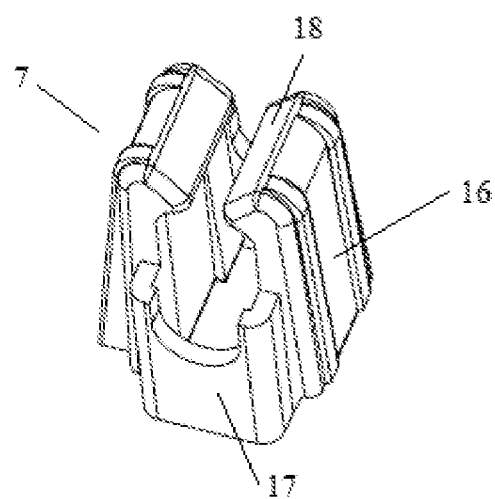
FIG. 2C is a schematic structural view of the articulated shaft-receiving base of the packaging storage container according to embodiments of the present application.

Referring to FIGS. 2A-2C and FIGS. 4A-4D, The articulated shaft-receiving bases 7 includes a connecting piece 17 and a pair of limiting walls 16, a lower end of the limiting walls 16 is connected to the ridge member 3, and an upper end of the limiting walls 16 is provided with a hook-shaped member 18, the pair of limiting walls 16 are provided to be spaced apart from each other, that is, the hook-shaped members 18 of the pair of limiting walls 16 are provided opposite to each other without contacting with each other. A gap is provided between the hook-shaped members 18 of the pair of limiting walls 16. In addition, as shown in FIG. 2An and 2B, the articulated shaft 6 is provided with a pair of flange portions 61 with column shape in axial direction thereof, the longitudinal length of the articulated shaft 6 between the pair of flange portions 61 is configured to correspond to the articulated shaft-receiving base 7 and is able to be inserted between the pair of limiting walls 16 through the gap between the hook-shaped members 18 and is slightly longer than the longitudinal length of the limiting walls 16, so that the limiting walls 16 can realize the engagement with the articulated shaft 6 through the longitudinal length of the articulated shaft 6 between the pair of flange portions 61. The connecting piece 17 is provided between the pair of the limiting walls 16, and the connecting piece 17 is respectively connected with each of the pair of the limiting walls 16 to form the inner space for accommodating the longitudinal length of the articulated shaft 6 between the pair of flange portions 61 with the limiting walls 16, and the connecting piece 17 is an arc-shaped piece curved upwards. In the conventional technology, the articulated shaft is often stuck in the articulated shaft-receiving base, and the user may break the articulated shaft if the user continues to turn over the tray. Referring to FIGS. 4A to 4D, the articulated shaft-receiving base 7 according to the embodiments enables the longitudinal length of the articulated shaft 6 between the pair of flange portions 61 to move along the arc-shaped structure of the connecting piece 17 when the tray 4 is turned over, and adaptively be located at a position where the tray 4 can be turned smoothly, which prevents the articulated shaft 6 from being broken when the articulated shaft 6 is stuck and the user continues to turn over the tray 4.

Both the container bottom portion 1 and the container cover portion 2 are provided with container edge members 5, and when the packaging storage container is closed, the container edge member 5 of the container bottom portion 1 abuts against the container edge member 5 of the container cover portion 2 to form the sealed container body with the ridge member 3. In the conventional technology, when the packaging storage container falls, the articulated shaft often hits the articulated shaft-receiving base, which causes the articulated shaft to be broken. The pair of the limiting walls 16 of the articulated shaft-receiving base 7 according to this embodiment are provided separately, and the distance between the pair of the limiting walls 16 is set so that when one end of the tray 4 laterally abuts against the container edge member 5, the longitudinal length of the articulated shaft 6 between the pair of flange portions 61 provided at the opposite end of the tray 4 does not contact with the limiting walls 16. Therefore, when the packaging storage container in the close state falls, one end of the tray 4 first laterally abuts against the container edge member 5, and the articulated shaft 6 does not contact with the limiting walls 16 of the articulated shaft-receiving base 7, which prevents the articulated shaft 6 from being broken in case of accidental fall or impact.

In addition, the pair of flange portions 61 may be integrated with the articulated shaft 6 or be separates parts and mounted to the articulated shaft 6.

Specially, referring to FIGS. 2An and 2B, the diameter of the pair of flange portions 61 is greater than the largest lateral width of the limiting walls 16, so that the flange portions 61 can limit the axial movement of the articulated shaft 6 relative to the articulated shaft-receiving base 7 in the longitudinal direction by contacting and abutting against one end of the limiting walls 16. Therefore, when the packaging storage container falls in direction shown in FIG. 5A, the flange portions 61 will abut against the limiting walls 16 so as to stop the trays 4 moving downward, and thus the trays 4 cannot be disengaged from the articulated shaft-receiving base 7.

Figure 3A:
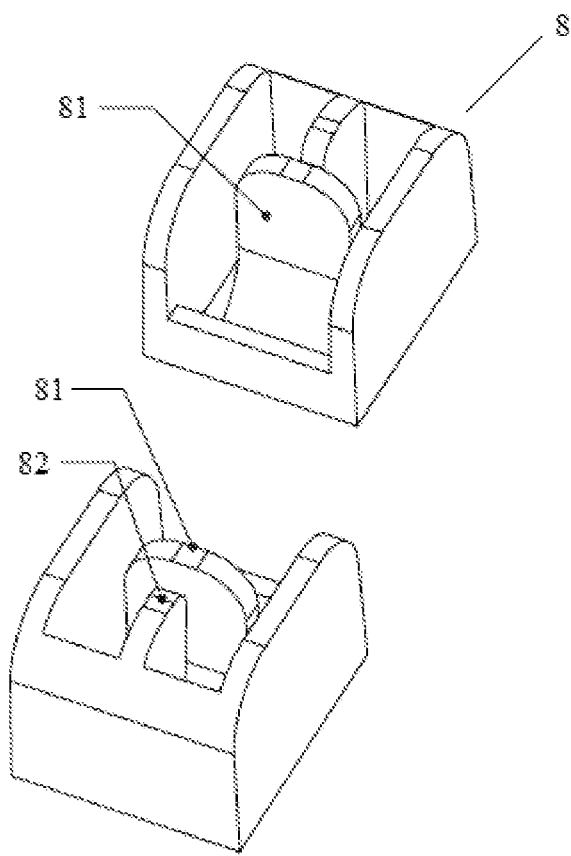
FIG. 3A is a schematic structural view of an articulated shaft-protection member of the packaging storage container according to embodiments of the present application.
Figure 3B:
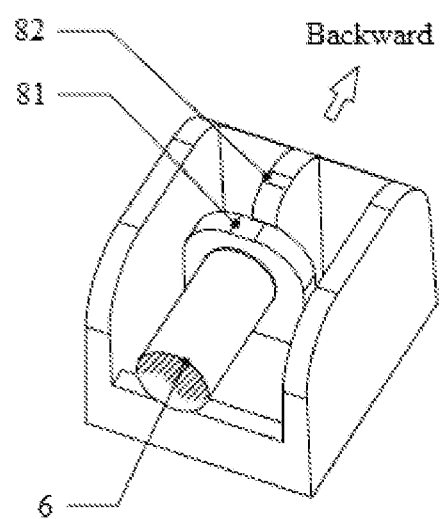
FIG. 3B is a schematic view of the cooperation of the articulated shaft-protection member with the articulated shaft according to embodiments of the present application.
Figure 4A:
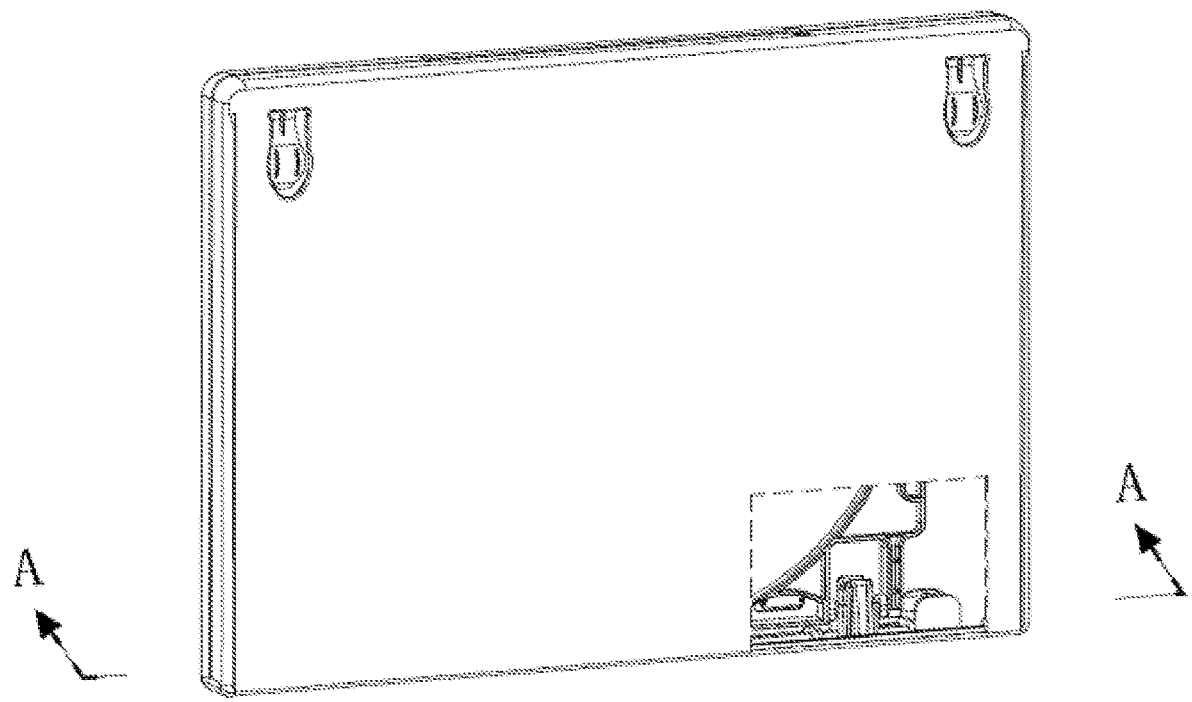
FIG. 4A is a schematic view of the packaging storage container in a turn-over state according to embodiments of the present application.
Figure 4B:
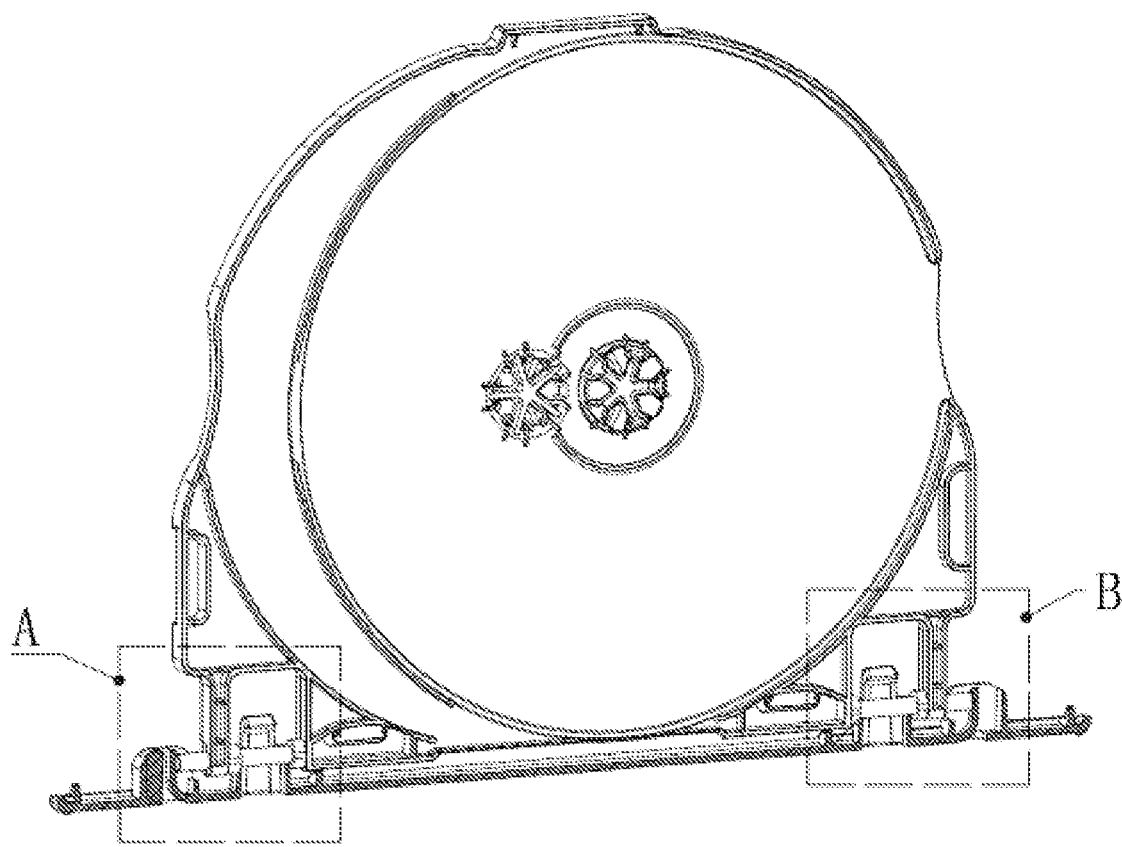
FIG. 4B is a schematic cross sectional view of FIG. 4A along line A-A.
Figure 4C:
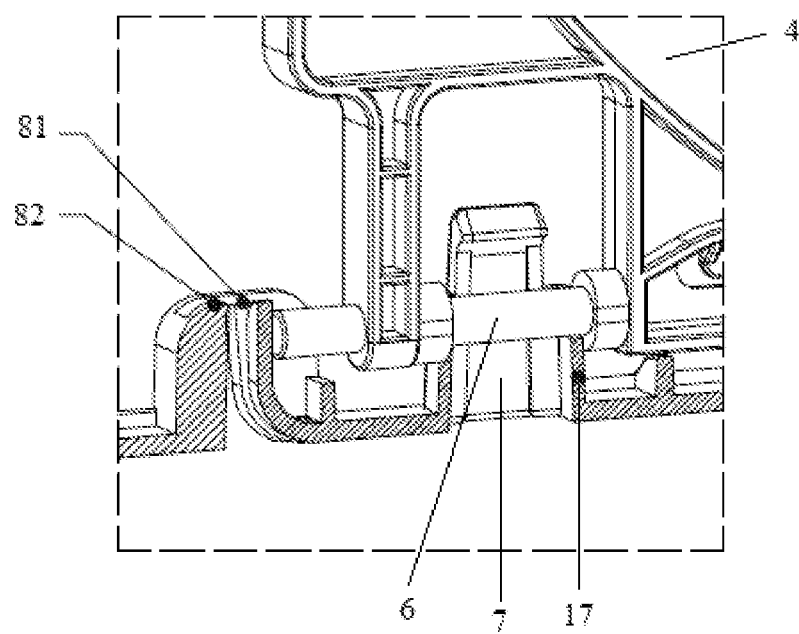
FIGS. 4C and 4D are partial enlarged views of area A and area B in FIG. 4B, respectively.
Figure 4D:
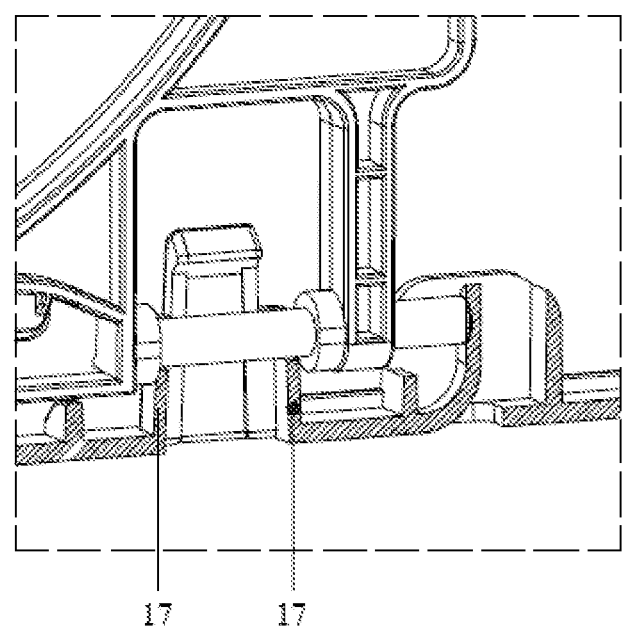

Referring to FIGS. 3An and 3B, the ridge member 3 is further provided with a pair of articulated shaft-protection members 8 at both longitudinal ends thereof, which are located longitudinal outside the articulated shaft-receiving base 7. The articulated shaft-protection members 8 have a shape of box and are open to the axial ends of the articulated shaft 6. The articulated shaft-protection members 8 are provided with an elastic sheet 81 and a stopper 82. The elastic sheet 81 faces the axial end of the articulated shaft 6 and is elastic. The stopper 82 is arranged opposite to the axial end of the articulated shaft 6 and configured to support the elastic sheet 81 from backside.

Referring to FIGS. 4B to 4D and FIGS. 5A to 5D, the axial end of the articulated shaft 6 is moved toward and thus abutted against the elastic sheet 81 as the packaging storage container being falling down, the elastic sheet 81 will move together with the articulated shaft 6 due to its own elasticity until being stopped by the back support from the stopper 82. With such structure, the functions of damping and stopping to the articulated shaft 6 can be obtained, and articulated shaft 6 can be prevented from being damaged during falling down.

Figure 5A:
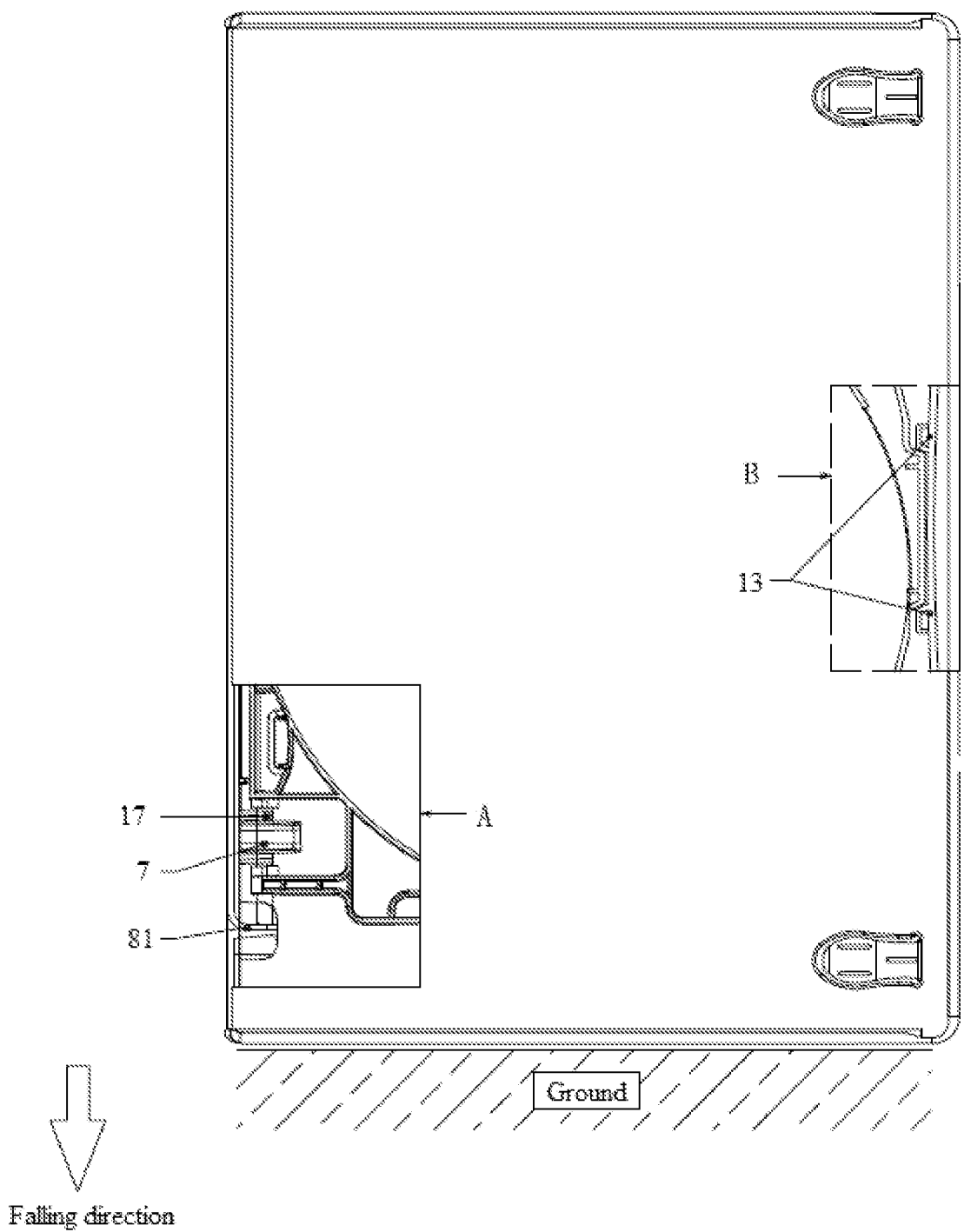
FIG. 5A is a schematic view of the packaging storage container in the falling state according to embodiments of the present application.
Figure 5B:
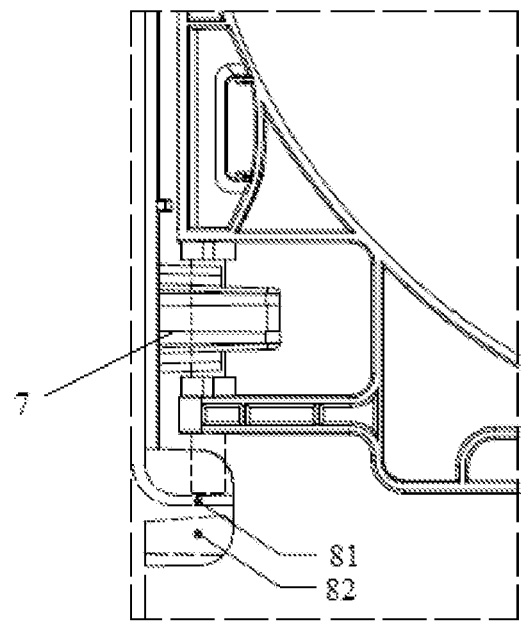
FIG. 5B is a partial enlarged sectional view of area in FIG. 5A.
Figure 5C:
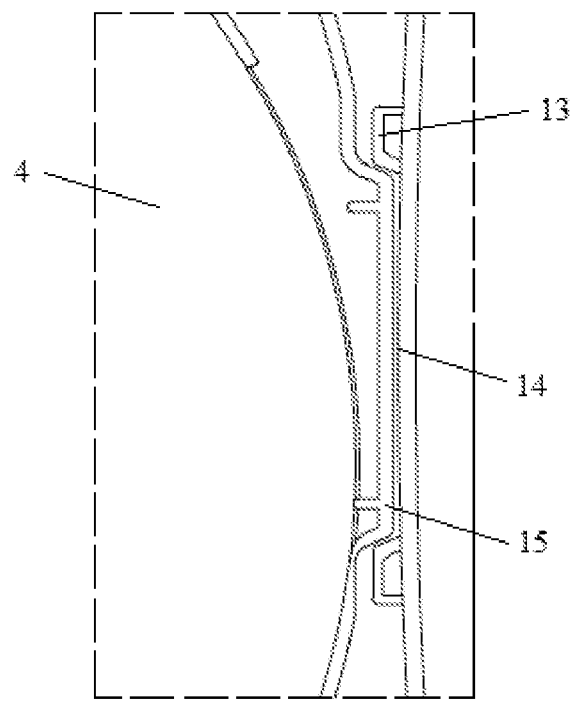
FIG. 5C is a partial enlarged sectional view of area B in FIG. 5A.
Figure 5D:
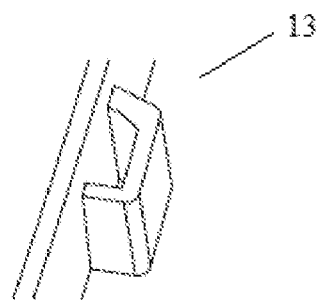
FIG. 5D is schematic structural view of a guiding block of the packaging storage container according to embodiments of the present application.
Figure 5E:
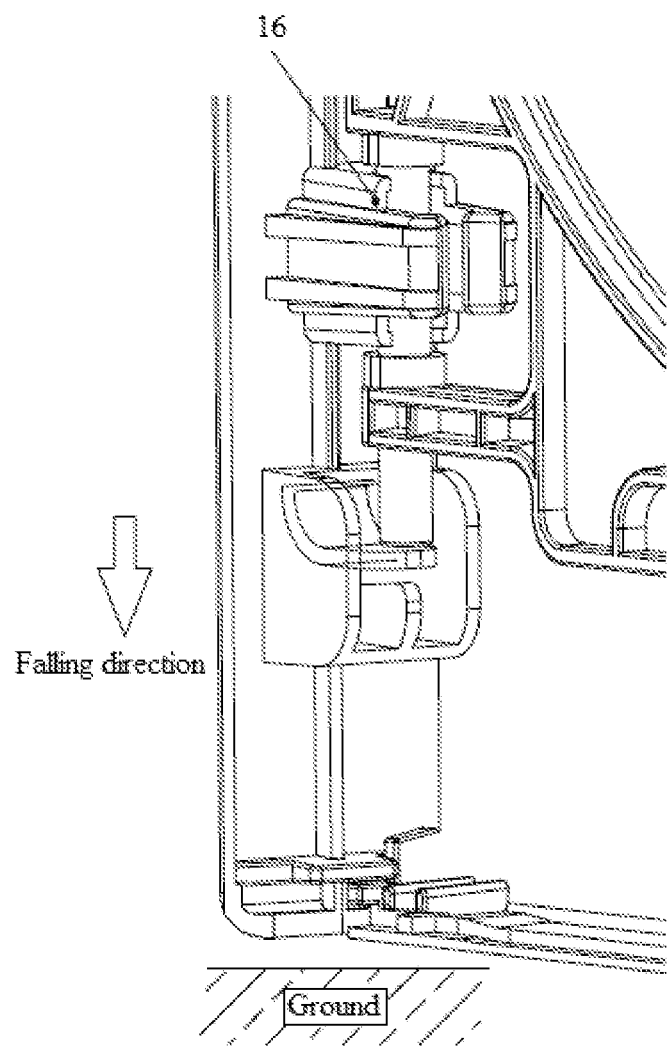
FIG. 5E is a partial enlarged sectional view of the packaging storage container in the falling state according to embodiments of the present application.

Referring to FIG. 1 and FIGS. 5A-5E, an upper guiding member 12 and a lower guiding member 11 are respectively provided on the container edge member 5 of the container cover portion 2 and the container bottom portion 1 laterally away from the ridge member 3, the upper guiding member 12 is provided on the container edge member 5 of the container cover portion 2, the lower guiding member 11 is provided on the container edge member 5 of the container bottom portion 1. Both the upper guiding member 12 and the lower guiding member 11 have the same structure and corresponding positions. In addition, both the upper guiding member 12 and the lower guiding member 11 have a pair of guiding blocks 13 at the corresponding positions, as shown in FIG. 5D. The guiding blocks 13 are provided with an arc-shaped chamfer, a guiding groove 14 is formed by a space between each pair of guiding blocks 13 in a longitudinal direction of the packaging container. An inclined surface is provided on a side of the guiding blocks 13 facing the guiding groove 14. An end of the tray 4 is provided with a protruding portion 15, a size and shape of the protruding portion 15 match with a size and shape of the guiding groove 14, so that when the packaging container is in the close state, the protruding portion 15 is held in the guiding groove 14 formed by the guiding blocks 13 of the upper guiding member 12 and the guiding blocks 13 of the lower guiding member 11, and a position of the upper guiding member 12 corresponds to a position of the lower guiding member 11, that is, the position of the upper guiding member 12 on the container cover portion 2 completely corresponds to the position of the lower guiding member 11 on the container bottom portion 1, so that the guiding blocks 13 of the upper guiding member 12 match and abut against the guiding blocks 13 of the lower guiding member 11 when the packaging storage container is closed. In the conventional technology, when the container cover portion is turned over, the tray is moved along with the container cover portion, and the moving trajectory of the tray is irregular during this time. When the container cover portion is turned over to the close state, the irregular movement of the tray may cause the tray to be stuck at a certain position of the container bottom portion, and the articulated shaft may be broken if the container cover portion continues to be turned over. In this embodiment, when the container cover portion 2 is turned over to the close state, the protruding portion 15 of the tray 4 can just enter into the guiding groove 14, so that the tray 4 is limited to be moved along a predetermined trajectory, which prevents the articulated shaft 6 from being broken when the tray 4 is in an abnormal position, and after the packaging storage container is closed, the guiding blocks 13 can block the protruding portion 15 of the tray 4 so as to limit the movement of the tray 4, which ensures the tray 4 not to shake. Referring to FIGS. 5An and 5C, since the guiding blocks 13 can limit and reduce the shaking of the tray, when the packaging storage container falls, the protruding portion 15 of the tray 4 abuts against the guiding blocks 13, which prevents the tray 4 from flying out of the packaging storage container.

Preferably, the tray 4 may be configured as one or more identical trays 4, and each of the trays 4 shares the same one articulated shaft, and can be turned around the articulated shaft-receiving bases 7 independently. Referring to FIG. 1, a first protuberance member 9 and a second protuberance member 10 for holding the sheet-like object are provided on each of the trays 4, and the first protuberance member 9 and the second protuberance member 10 are respectively located on opposite surfaces of each of the trays 4 with being offset with each other, that is, both the front and back surfaces of each tray 4 can hold a sheet-like object.

In addition, it should be noted by those skilled in the art that the shape of each of the trays 4 may be changed according to the shape of the sheet-like object to be stored, for example, the shape may be square, rectangular, oval, etc., and a groove for accommodating an object with a specific shape and thickness may be provided on local area of each tray. The above variant and modification should not be deemed as depart form the scope of the present application.

In summary, an inner space for self-adaptive rotation and shock absorption of the articulated shaft is provided in articulated shaft-receiving base according to the present application, when the tray is turned over, the tray can be adaptively moved along inner walls of the limiting walls and the connecting piece, which can prevent the articulated shaft from being broken when being stuck in the articulated shaft-receiving base. The pair of the limiting walls are provided separately with being spaced a distance, so that in case that one end of the tray abuts against the container edge member, the articulated shaft at the other end of the tray does not contact with the limiting walls, which can prevent the articulated shaft from strike the articulated shaft-receiving base and being broken when the packaging storage container falls. The container edge member is provided with the guiding member, when the container cover portion is turned over into the close state, the protruding portion of the tray can just enter into the guiding groove of the guiding member, so that the tray is moved along the predetermined trajectory, which prevents the articulated shaft from being broken when the tray is in an abnormal position, and after the packaging storage container is closed, the guiding member can hold the tray and continue to limit the movement of the tray, which ensures the tray not to shake. The front and back surfaces of the tray are provided with the protuberance member, which can hold the sheet-like objects on both surfaces, and the container bottom portion is further provided with the protuberance member, which can hold another sheet-like object.

Finally, it should be noted that, the above embodiments are merely used to illustrate the technical solutions of the present application, not to limit it. Although the present application has been described in detail with reference to the foregoing embodiments, those having ordinary skills in the art should understand that they can still modify the technical solutions described in the foregoing embodiments, or equivalently replace some of the technical features. And these modifications or replacements do not cause the essence of the corresponding technical solutions to depart from the spirit and scope of the technical solutions of the embodiments of the present disclosure.

The invention claimed is:

1. A packaging storage container, used for accommodating a sheet-like object, the packaging storage container comprises a container bottom portion, a container cover portion, a ridge member and a tray;

the container bottom portion and the container cover portion are hinged to the ridge member, the container bottom portion and the container cover portion form a sealed container body with the ridge member, and the tray is configured to hold the sheet-like object;

the ridge member is provided with a pair of articulated shaft-receiving bases, the tray is connected to the pair of articulated shaft-receiving bases through an articulated shaft provided on the tray, an inner space for self-adaptive rotation and shock absorption of the articulated shaft is formed in each articulated shaft-receiving base, the articulated shaft is provided with a pair of flange portions with column shape in axial direction thereof, the longitudinal length of the articulated shaft between the pair of flange portions is configured to correspond to each articulated shaft-receiving base and be accommodated in the inner space so that the tray is turned over around each articulated shaft-receiving base;

wherein both the container bottom portion and the container cover portion are provided with a guiding member, respectively, and the tray is provided with a protruding portion cooperating with the guiding member, wherein each articulated shaft-receiving base comprises a connecting piece and a pair of limiting walls, a lower end of each limiting wall is connected to the ridge member, and an upper end of each limiting wall is provided with hook-shaped members, and the hook-shaped members are provided opposite to each other, the connecting piece is provided between the pair of the limiting walls and is respectively connected with the pair of the limiting walls to form the inner space for accommodating the articulated shaft, and the connecting piece is an arc-shaped piece curved upwards, wherein the diameter of the pair of flange portions is greater than the largest lateral width of the limiting wall.

2. The packaging storage container according to claim 1, wherein each guiding member of the container bottom portion and the container cover portion is provided with a guiding groove, which cooperates with the protruding portion of the tray.

3. The packaging storage container according to claim 1, wherein the ridge member is provided with a pair of articulated shaft-protection members at both longitudinal ends thereof, which are located longitudinally outside the articulated shaft-receiving base, wherein the articulated shaft-protection members have a shape of a box and are open to the axial ends of the articulated shaft, wherein the articulated shaft-protection members are provided with an elastic sheet and a stopper, the elastic sheet faces the axial end of the articulated shaft and is elastic and the stopper is arranged opposite to the axial end of the articulated shaft and configured to support the elastic sheet from backside, wherein, when the axial end of the articulated shaft is moved toward and thus abutted against the elastic sheet, the elastic sheet moves together with the articulated shaft, and then is stopped by the stopper from back support.

4. The packaging storage container according to claim 2, wherein each guiding member of the container bottom portion and the container cover portion further comprises a pair of guiding blocks, the guiding blocks are provided with an arc-shaped chamfer, and the guiding groove is formed by a space between the pair of guiding blocks in a longitudinal direction of the packaging storage container.

5. The packaging storage container according to claim 4, wherein an inclined surface is provided on a side of the guiding blocks facing the guiding groove.

6. The packaging storage container according to claim 4, wherein each guiding member comprises an upper guiding member and a lower guiding member with the same structure, both the container bottom portion and the container cover portion have a container edge member, the upper guiding member is provided on the container edge member of the container cover portion, the lower guiding member is provided on the container edge member of the container bottom portion, a position of the upper guiding member corresponds to a position of the lower guiding member, and the guiding blocks of the upper guiding member match and abut against the guiding block of the lower guiding member when the packaging storage container is closed.

7. The packaging storage container according to claim 1, wherein the pair of limiting walls is configured to be spaced apart from each other, so that the articulated shaft at one lateral end of the tray does not contact with the limiting walls when the other lateral end of the tray abuts against the container edge member.

8. The packaging storage container according to claim 1, wherein a first protuberance member and a second protuberance member for holding the sheet-like object are provided on the tray, and the first protuberance member and the second protuberance member are respectively located on opposite surfaces of the tray and are offset from each other.

* * * * *